US010553846B1

(12) United States Patent
Lim et al.

(10) Patent No.: US 10,553,846 B1
(45) Date of Patent: Feb. 4, 2020

(54) SYSTEM FOR THERMAL MANAGEMENT OF A BATTERY

(71) Applicant: AMAZON TECHNOLOGIES, INC., Seattle, WA (US)

(72) Inventors: James Robert Lim, San Jose, CA (US); Chia-Jean Wang, Palo Alto, CA (US); Ryan Michael Fleming, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 749 days.

(21) Appl. No.: 15/084,335

(22) Filed: Mar. 29, 2016

(51) Int. Cl.
*H01M 2/10* (2006.01)
*H01M 8/04007* (2016.01)
*H01M 10/617* (2014.01)
*H01M 10/655* (2014.01)

(52) U.S. Cl.
CPC ..... *H01M 2/1094* (2013.01); *H01M 8/04067* (2013.01); *H01M 10/617* (2015.04); *H01M 10/655* (2015.04); *H01M 2220/30* (2013.01); *H01M 2250/30* (2013.01)

(58) Field of Classification Search
CPC ............. H01M 2/1094; H01M 10/617; H01M 10/655; H01M 8/04067; H01M 2220/30; H01M 2250/30
USPC ......................................................... 429/436
See application file for complete search history.

(56) References Cited

U.S. PATENT DOCUMENTS

| 5,871,859 A * | 2/1999 | Parise | B01F 5/0614 320/150 |
| 6,970,399 B2 * | 11/2005 | Watanabe | G04B 37/18 368/204 |
| 7,550,949 B2 * | 6/2009 | Woo | H01M 10/633 320/150 |

(Continued)

FOREIGN PATENT DOCUMENTS

EP          1522908 B1 *  5/2008    ............. G04C 10/02

OTHER PUBLICATIONS

A.L. Andrady, Mike A. Neal, Applications and Societal Benefits of Plastics, Jul. 27, 2009, The Royal Society Publishing, vol. 364, Issue 1526, available at https://royalsocietypublishing.org/doi/10.1098/rstb.2008.0304 (Year: 2009).*

(Continued)

*Primary Examiner* — Anthony R Jimenez
(74) *Attorney, Agent, or Firm* — Lindauer Law, PLLC

(57) ABSTRACT

Described are techniques for improving the functionality of a computing device by regulating the temperature of an energy storage device used to power the computing device. A housing that encloses the energy storage device may include a first portion having a thermal conductivity that exceeds that of a second portion. The first portion may be configured to contact or be positioned proximate to a user's body or other heat-producing object during use. Heat from the user's body or other object may be conducted through the first portion of the housing toward the energy storage device. The less-conductive second portion of the housing may reduce the rate at which heat from the energy storage device is transmitted into the ambient environment. As a result, the temperature of the energy storage device may increase, improving the performance thereof.

24 Claims, 11 Drawing Sheets

(56) References Cited

U.S. PATENT DOCUMENTS 7,876,069 B2 * 1/2011 Norimatsu ........ H01M 8/04246
320/132
2007/0025187 A1 * 2/2007 Agesawa .................. G04F 5/14
368/157

OTHER PUBLICATIONS

"Thermal Management", MPowerUK, Battery and Energy Technologies, retrieved on Mar. 22, 2016 at <http://www.mpoweruk.com/thermal.htm>, 7 pgs.

* cited by examiner

US 10,553,846 B1

SYSTEM FOR THERMAL MANAGEMENT OF A BATTERY

BACKGROUND

Batteries and other sources of stored energy for devices may function with increased or decreased efficiency due to the temperature of the energy storage source.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
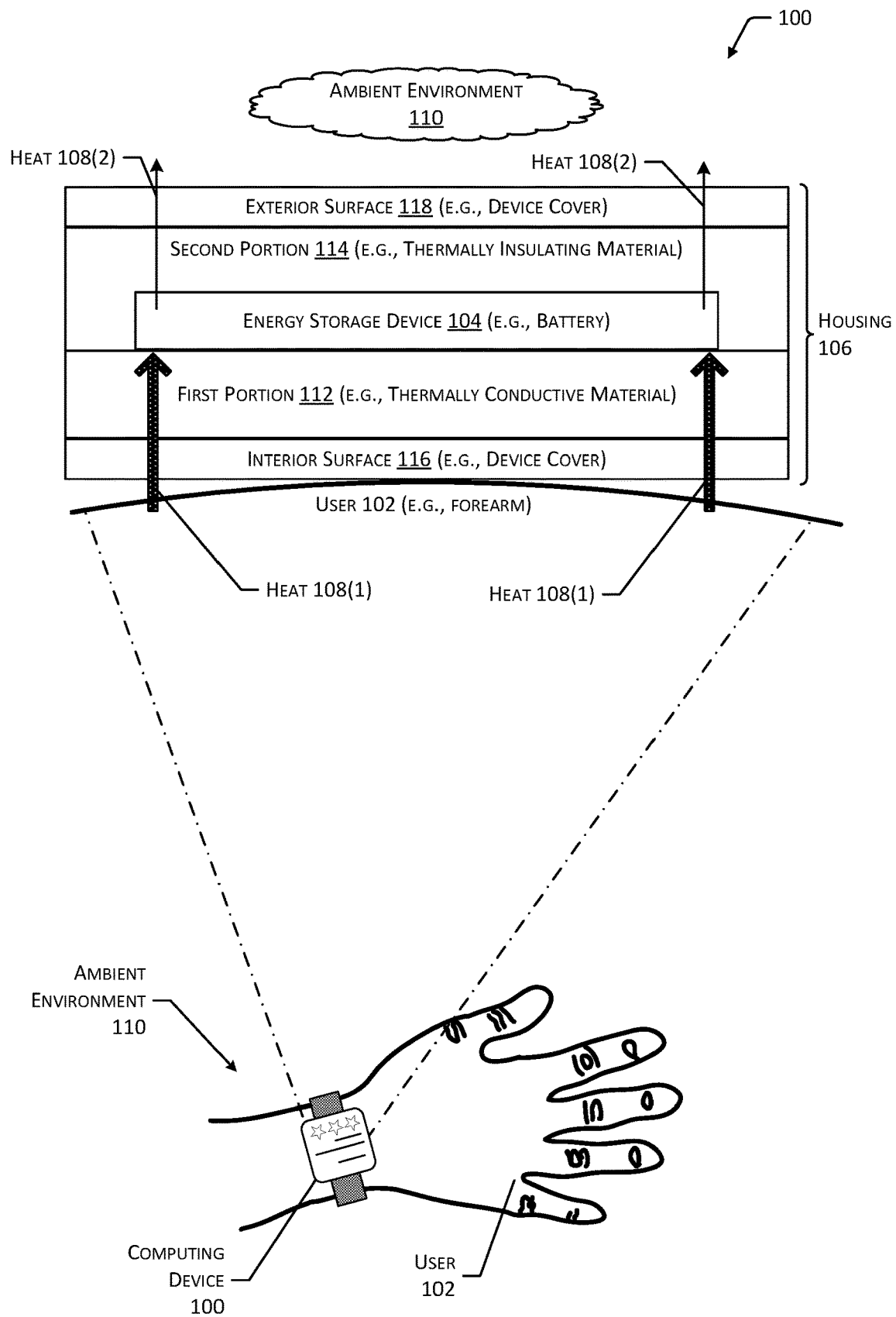
FIG. 1 depicts a computing device within the scope of the present disclosure, illustrating use of heat from a user to increase the temperature of an energy storage device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

An energy storage device, such as a battery, may exhibit different electrical characteristics (e.g., direct current resistance (DCR)) based on the temperature of the energy storage device. The effect of temperature on the DCR of a battery may be especially apparent when using a small capacity battery (e.g., having a capacity of 320 milliampere hours (mAh) or less). Temperature may also significantly affect the DCR of a battery having a small volume (e.g., 1.5 cubic centimeters or less), or other types of energy storage devices having large energy densities significantly affected by temperature. For example, some batteries may experience an increase in DCR of 200 percent or greater at zero degrees Celsius (C) when compared to operation of the batteries at a normal operating temperature (e.g., 25 degrees C.). Many wearable computing devices, such as head-mounted devices, devices having the form factor of a watch, devices worn on the ear, wrist, waist, or ankle, and so forth, may be powered using small batteries that may be significantly affected by temperature. At low temperatures (e.g., less than 15 degrees C.), the batteries that power these devices may exhibit significant increases in DCR. At zero degrees C., the DCR of a battery powering a wearable device may increase by as much as four times the DCR at a normal operating temperature. The effect of low temperatures on the batteries of wearable computing devices may cause the devices to prematurely shut down or exhibit other power irregularities or system instabilities when used in a cold ambient environment. Increasing the temperature of such a battery by as little as one to five degrees C. may significantly improve the performance of the battery, and thus, of the computing device. For example, increasing the temperature of a battery from zero degrees C. to one degree C. may increase the usable energy capacity of the battery by five percent or more. Increasing the temperature of a battery by five degrees C. may increase the usable energy capacity of the battery by fifteen percent or more.

Described in this disclosure are techniques for changing the temperature of an energy storage device based on characteristics of the housing that contains the energy storage device. In one example, a wearable computing device, or another type of computing device that contacts a user's body or other object during use, may include a battery or another type of energy storage device (e.g., a fuel cell) at least partially enclosed in a housing. In some implementations, the computing device may not necessarily contact a user's body, but may be positioned proximate thereto. For example, portions of a head mounted device that include computing components may be spaced from a user's body by a small gap.

The housing that encloses the battery may include a first portion that contacts (or is positioned close to) a user's body during use, and a second portion positioned remote from the user's body, relative to the first portion. In some implementations, the first portion of the housing may be formed from a material that is more thermally conductive than the material from which the second portion of the housing is formed. For example, the first portion may be formed from carbon-based materials, metallic materials, conductive ceramics, conductive polymers, and so forth, while the second portion is formed from polyethylene terephthalate (PET) or another type of plastic, rubber, other insulating polymers, and so forth. In some implementations, the thermally conductive material may also be an electrically conductive material. In other implementations, other characteristics of the housing or the placement of the battery may affect the thermal conductivity of the first and second housing portions. For example, the first portion of the housing may have a thickness less than that of the second portion of the housing, providing the first portion of the housing with a greater thermal conductivity than that of the second. As another example, the battery of the computing device may be positioned closer to the first portion of the housing than to the second portion, such that with regard to the battery, the first portion is more thermally conductive than the second portion due to the presence of additional material or space between the battery and the second portion. As yet another example, the surface area of the housing that contacts or is positioned proximate to a user or other object, or the surface area of the housing that contacts or is positioned proximate to the battery, may affect the thermal conductivity of the first and second housing portions.

In some implementations, the first portion of the housing may define conductive pathways between the exterior of the housing and the battery. For example, portions of a wearable device that contact a user's body may include a material having high thermal conductivity, while other portions of the exterior of the housing include a thermally insulating material. The conductive material may extend from the portions of the device that contact the user inward into the interior of the device to conduct heat from the user's body toward the battery. For example, the conductive pathways may include "tunnels" of conductive material at least partially enclosed by an insulating material to reduce the transfer of heat away from the conductive pathways.

When the computing device contacts or is positioned proximate to the user's body, heat from the user's body may be conducted, through the thermally conductive first portion of the housing, toward the battery. In cases where the computing device is spaced from the user's body, heat from the user's body may radiate across the space between the body and the device to the thermally conductive first portion and be transferred toward the battery. The second portion of the housing may function as a thermal insulator to reduce the rate at which the heat conducted to the battery is transferred to the ambient environment external to the computing device. The thermal characteristics of the housing may therefore enable the temperature of the battery to be increased using heat from the user's body or another object that contacts or is proximate to the computing device.

In other implementations, a user's body or another object contacting or proximate to the computing device may be used as a heat sink. For example, when a computing device is used in a very warm ambient environment, the thermally insulating second portion of the housing may reduce the transfer of heat from the ambient environment. The thermally conductive first portion of the housing may transfer heat from the battery toward the user's body, or another object, thereby reducing the temperature of the battery toward a more optimal operating temperature. For example, a user may occasionally immerse a wearable device, or the portion of the user's body wearing a device, into water or another liquid to enable the liquid to function as a heat sink. As another example, a user's perspiration may function to remove heat from an adjacent wearable device. In still other implementations, the housing of the battery may be configured to exchange heat with the ambient environment while reducing the transfer of heat to the user's body or other adjacent object. For example, the thermally insulating second portion of the housing may be positioned proximate to the user's body while the thermally conductive first portion is positioned remote from the user. Heat from the ambient environment, such as air heated by the sun or another heat source, may be transferred toward the battery by way of the thermally conductive material. Alternatively, the ambient environment may be used as a heat sink, and heat from the battery may be transferred away from the battery by way of the thermally conductive material, while the thermally insulating material reduces the transfer of heat from the user's body toward the battery.

FIG. 1 depicts a computing device 100 within the scope of the present disclosure. The depicted computing device 100 includes a wearable device having the form factor of a wristwatch. However, in other implementations, the computing device 100 could include other types of wearable devices, such as a head-mounted device. The computing device 100 could also include a portable device (e.g., a smartphone or e-book reader), or any other type of computing device 100 that may contact or be positioned proximate to the body of a user 102 or another object during operation thereof. In another implementation, the computing device 100 may include a wearable device configured for use with an animal, such as a collar for use by a dog or cat. As another example, the computing device 100 may include an implantable computing device intended to be at least partly enclosed in the body of a human or animal. In other implementations, rather than a human user 102, the object contacted by the computing device 100 may include the Earth's surface, a wall, floor, or ceiling, an article of furniture, another computing device, or any other natural or manmade surface. For example, other types of computing devices 100 may include devices configured to be placed in contact with or at least partially buried in the earth's surface, such that heat from the earth's surface is transmitted to the computing device 100. As another example, the computing device 100 may be configured for attachment to an adjacent computing device having one or more components that generate heat during use.

FIG. 1 depicts the computing device 100 including an energy storage device 104 enclosed by a housing 106 that, in use, contacts the body of a user 102 wearing the computing device 100. The energy storage device 104 may include any source of stored energy configured to be discharged to power one or more components in electrical communication with the energy storage device 104. In some implementations, the energy storage device 104 may include a battery, such as a lithium-based battery. In another implementation, the energy storage device 104 may include a battery having a capacity of 320 mAh or less. In other implementations, the capacity of the battery may be less than or equal to 300 mAh. In still other implementations, the capacity of the battery may range from 120 to 200 mAh. In some implementations, the energy storage device 104 may include a battery having a volume of 1.5 cubic centimeters or less. In other implementations, the energy storage device 104 may include a battery having a volume of 1.2 cubic centimeters or less. The battery may include any number of cells. For example, a battery may include a single cell having a volume of 1.5 cubic centimeters or less. As another example, a battery may include a group of cells formed into a single assembly having a volume of 1.5 cubic centimeters or less. In still other implementations, the energy storage device 104 may include a battery having an energy density such that a decrease in the temperature of the battery from 25 degrees C. to zero degrees C. will result in at least a 200 percent increase in the DCR of the battery. As another example, the energy storage device 104 may include a battery having an energy density such that a decrease in the temperature of the battery from 25 degrees C. to zero degrees C. will result in at least a 400 percent increase in the DCR of the battery. As yet another example, the energy storage device 104 may include a battery having an energy density such that an increase in the temperature of the battery from zero degrees C. to one degree C. will result in at least a 5 percent increase in the usable energy capacity of the battery. In other implementations, the energy storage device 104 may include a battery having an energy density such that an increase in the temperature of the battery from zero degrees C. to five degrees C. will result in at least a 15 percent increase in the usable energy capacity of the battery. In some implementations, the energy storage device 104 may include a fuel cell. For example, fuel cells that incorporate conversion of glucose, oxygen, or other sugars or organic materials into electricity may function optimally at temperatures at or near those of a user's body. Such fuel cells may be used in conjunction with a computing device 100 that contacts or is positioned in close proximity to the body of a user 102.

The housing 106 of the computing device 100 may be configured to conduct heat 108(1) from the user 102 or other adjacent object toward the energy storage device 104 and to reduce the rate at which heat 108(2) is conducted away from the energy storage device 104 into the ambient environment 110 external to the housing 106. For example, the housing 106 may include a first portion 112 formed from a thermally conductive material, the first portion 112 being positioned between the user 102 and the energy storage device 104. In some implementations, the material from which the first portion 112 is formed may have a thermal conductivity of at least 300 watts per meter Kelvin (W/m*K). In other implementations, the material from which the first portion 112 is formed may have a thermal conductivity ranging from 300 W/m*K to 1500 W/m*K. Example materials from which the first portion 112 is formed may include, without limitation, carbon-based fillers (e.g., carbon black, graphite, graphene, diamond), metallic fillers (e.g., silver, gold, platinum, copper, nickel, aluminum, titanium), conductive ceramics, conductive polymers, elastomers, thermoplastics, emulsions, thermosets, and so forth. Example morphologies of the materials from which the first portion 112 is formed may include, without limitation, nanowires, nanotubes, nanoscrolls, nanosheets, nano-core-shell structures, hollow nanowires, hollow nanospheres, non-hollow nanospheres, nanoparticles, other nanoarchitectures, and so forth. In some implementations, the first portion 112 may be formed from an anisotropic material to facilitate transfer of heat 108(1) in a particular direction (e.g., toward the energy storage device 104) while restricting the transfer of heat 108(1) in one or more other directions. In other implementations, the material of the first portion 112 may be isotropic.

The thermally conductive nature of the first portion 112 may facilitate the transfer of heat 108(1) from the user 102 toward the energy storage device 104. For example, if the temperature of the computing device 100 is less than the body temperature of the user 102, contact between the body of the user 102 and the housing 106 may enable heat 108(1) from the user's body to be transmitted through the first portion 112 of the housing 106 to the energy storage device 104. In some implementations, the first portion 112 of the housing 106 may at least partially enclose the energy storage device 104 to provide heat 108(1) to multiple surfaces thereof and achieve a generally even temperature distribution to multiple portions of the energy storage device 104.

A second portion 114 of the housing 106 may be formed from a material having a thermal conductivity less than that of the first portion 112. In some implementations, the second portion 114 may be formed from a thermally insulating material. For example, the material from which the second portion 114 is formed may have a thermal conductivity of 50 W/m*K or less. Example materials from which the second portion 114 is formed may include PET or another type of plastic. A portion of the heat 108(2) provided to the energy storage device 104 may be conducted through the second portion 114 into the ambient environment 110. However, because the thermal conductivity of the second portion 114 is less than that of the first portion 112, the rate at which heat 108(1) is conducted from the user 102 to the energy storage device 104 may exceed the rate at which heat 108(2) is conducted from the energy storage device 104 to the ambient environment 110. Therefore, the housing 106 may enable the temperature of the energy storage device 104 to increase over time, as the computing device 100 remains associated with the user 102.

In some implementations, the housing 106 may also include a cover material in addition to the first portion 112 and the second portion 114. For example, FIG. 1 depicts the housing 106 including an interior surface 116 and an exterior surface 118. The interior surface 116 and exterior surface 118 may be formed from any manner of thermally conductive or thermally insulating material or may be configured to provide aesthetic or functional features to the computing device 100, such as improving the visibility of the computing device 100 or providing a frictional gripping surface thereto. For example, the interior surface 116 and exterior surface 118 may include one or more metals, plastics, rubbers, other polymers, ceramics, composites, and so forth. In some implementations, the thickness or material of the interior surface 116 may be selected such that the presence of the interior surface 116 does not significantly affect the transfer of heat 108(1) from the user 102 to the first portion 112. Similarly, the thickness or material of the exterior surface 118 may be selected such that the exterior surface 118 does not significantly affect the transfer of heat 108(2) through the second portion 114. However, in some implementations, the interior surface 116 may be formed from a thermally conductive material to facilitate transfer of heat 108(1) toward the energy storage device 104. Additionally, in some implementations, the exterior surface 118 may be formed from a thermally insulating material to reduce transfer of heat 108(2) into the ambient environment 110. In other implementations, the cover material may be omitted, and the first portion 112 and second portion 114 of the housing 106 may define the outer surfaces of the computing device 100.

Figure 2:
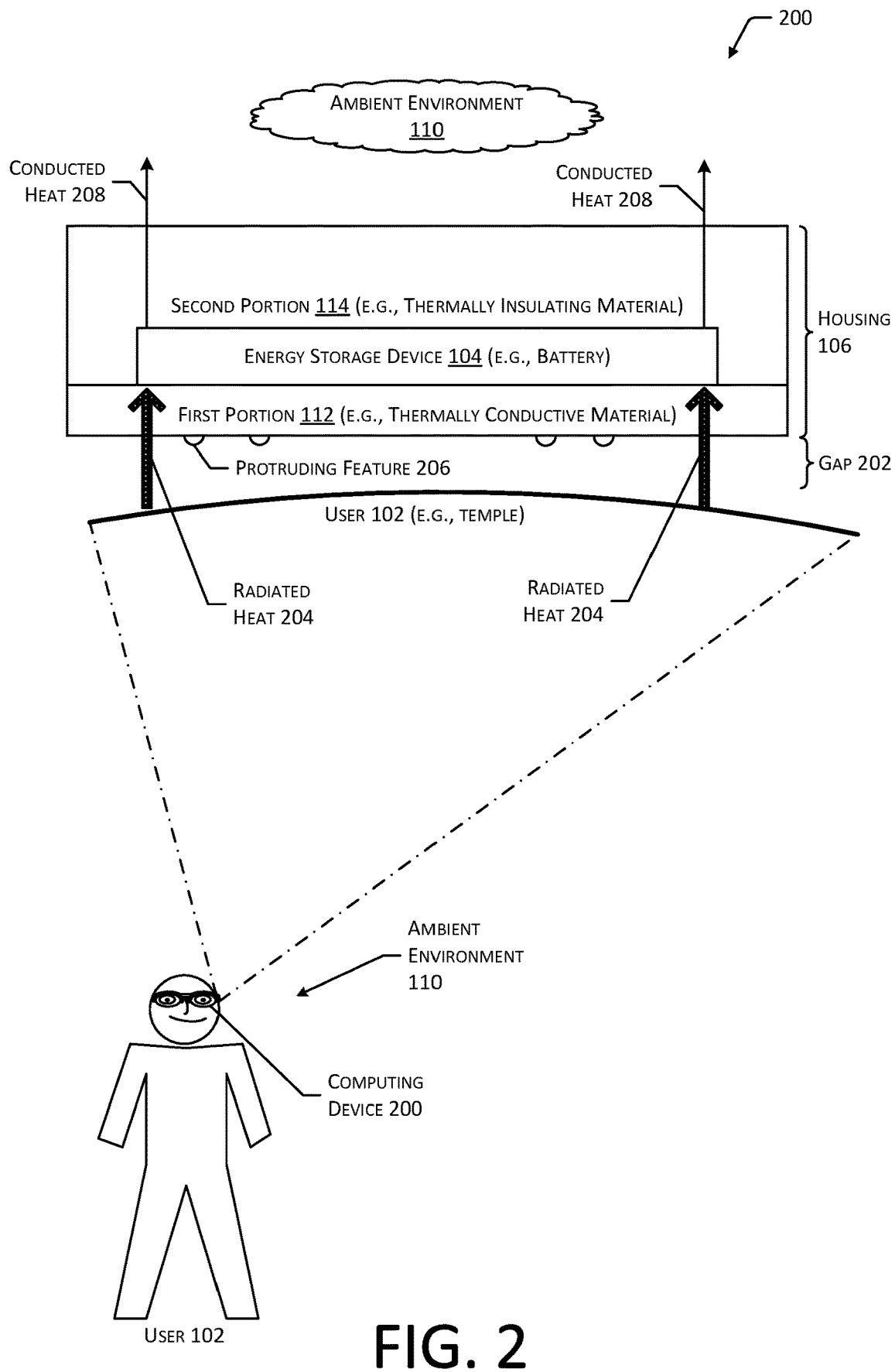
FIG. 2 depicts a computing device within the scope of the present disclosure, illustrating use of radiated heat from a user to increase the temperature of an energy storage device.

FIG. 2 depicts an additional implementation of a computing device 200 within the scope of the present disclosure. The depicted computing device 200 includes a wearable, head-mounted computing device 200 having the form factor of glasses. The computing device 200 may include an energy storage device 104 enclosed by a housing 106 that includes a first portion 112 formed from a thermally conductive material and a second portion 114 formed from a thermally insulating material. The computing device 200 lacks a separate layer of covering material, such that the surface of the first portion 112 that faces the user 102 defines the interior surface 116 of the housing 106, while the surface of the second portion 114 that faces the ambient environment 110 defines the exterior surface 118 of the housing 106. In some implementations, one or more of the first portion 112 or the second portion 114 may be at least partially fire resistant to conform to industry standards. For example, the first portion 112 or the second portion 114 may include a rating of at least V-1 or better under the UL 94 Standard for Safety of Flammability of Plastic Materials for Parts in Devices and Appliances. As another example, independent of the fire resistant capabilities of the first portion 112 or the second portion 114, a label, wrap, or similar covering material may be provided around the energy storage device 104, the covering material having a rating of at least V-1 or better.

While portions of the head-mounted computing device 200, such as a nosepiece or earpieces, may contact the body of the user 102 during use, other portions of the computing device 200 may be proximate to the user 102 but spaced apart from the user's body by a small gap 202. Radiated heat 204 from the body of the user 102 may be transmitted across the gap 202 to the first portion 112 of the housing, which may conduct the radiated heat 204 to the energy storage device 104. In some implementations, the first portion 112 may include one or more protruding features 206, such as raised lands, fins, fans, slanted regions, and so forth, that may function to increase the surface area of the first portion 112, thereby increasing the amount of radiated heat 204 to which the first portion 112 is exposed. In devices configured to contact the body of the user 102, protruding features 206 may also function to improve the comfort of a wearable device. For example, protruding features 206 may be positioned at ergonomic locations or pressure points on a user's body to provide a relaxed fit for a length of time. Due to the thermally insulating nature of the second portion 114, the rate at which conducted heat 208 is transmitted from the energy storage device 104 to the ambient environment 110, through the second portion 114, may be less than that which the radiated heat 204 is transmitted to the energy storage device 104. The structure of the housing 106 may therefore enable the radiated heat 204 from the user's body to increase the temperature of the energy storage device 104.

Figure 3:
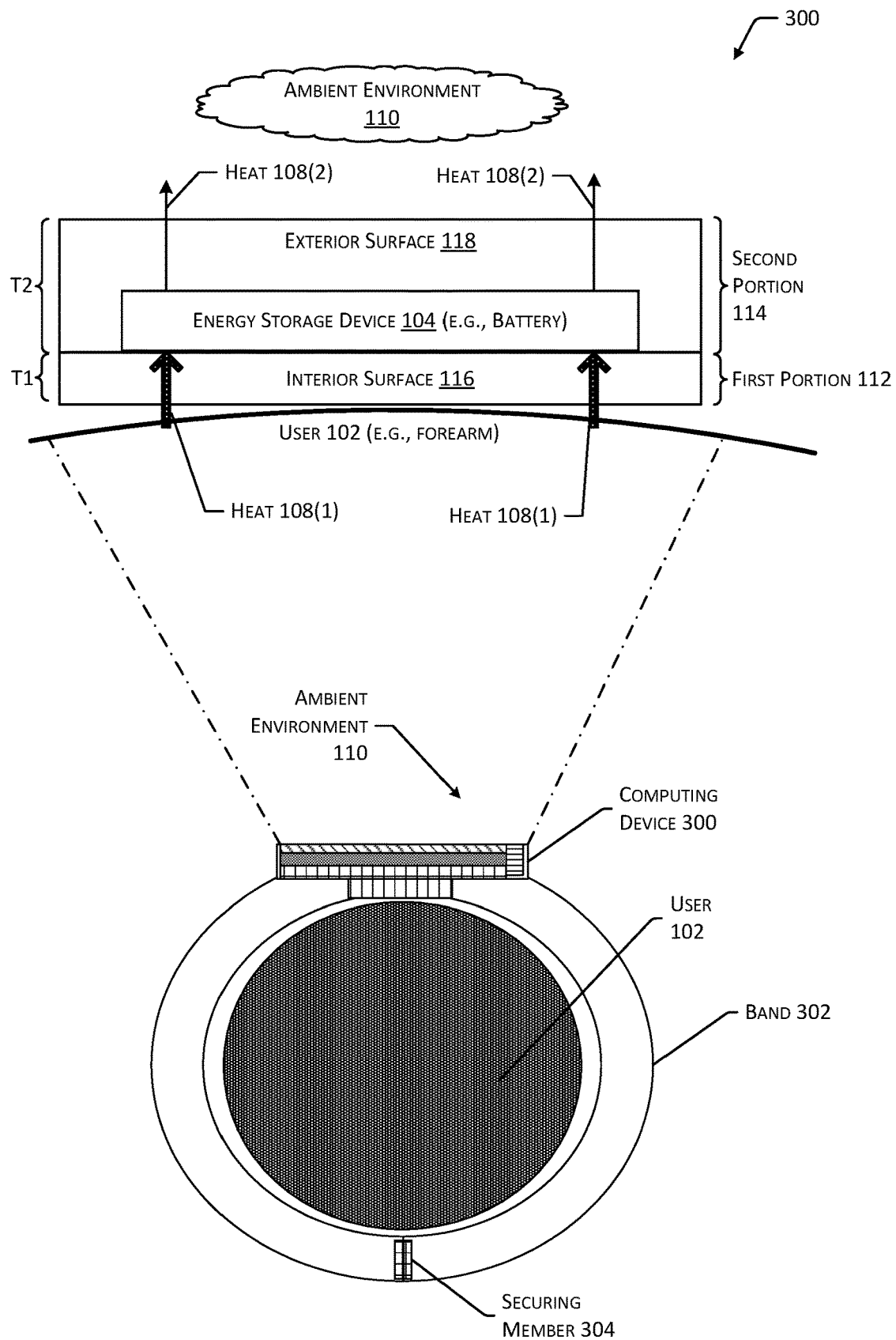
FIG. 3 depicts a computing device within the scope of the present disclosure, illustrating use of the thickness of housing portions to control the transfer of heat to and from an energy storage device.

In other implementations, the relative thermal conductivities of the first portion 112 and the second portion 114 may be affected by structural characteristics other than the materials from which the first portion 112 and the second portion 114 are formed. For example, FIG. 3 depicts an example computing device 300 in which the thermal conductivities of the first portion 112 and the second portion 114 are determined primarily by the thicknesses thereof. The depicted computing device 300 is shown as a wearable device adapted to engage a limb of a user 102, such as by engaging the computing device 300 with an arm, wrist, or ankle. For example, the computing device 300 may be attached to a band 302 or strap, which can be secured around a user's limb using a clasp, snap, clip, magnetic feature, or other type of securing member 304. In some implementations, the securing member 304 may also function to activate or deactivate the computing device 300. For example, closing of the securing member 304 about a user's limb may be configured to activate the computing device 300, while opening the securing member 304 may be configured to deactivate the computing device 300. As another example, the computing device 300 may include a separate control for activation, but activation of the computing device 300 may require the securing member 304 to be in a closed position. The computing device 300 includes an energy storage device 104, such as a battery, enclosed by a housing 106 that includes a first portion 112 and a second portion 114. The first portion 112 defines the interior surface 116 of the housing 106, which may contact the body of a user 102 or another object during use. The second portion 114 defines the exterior surface 118 of the housing 106, which may be positioned remote from the user's body, relative to the first portion 112, and in association with the ambient environment 110 external to the computing device 300. The first portion 112 may have a first thickness T1 that is less than a second thickness T2 of the second portion 114, such that the thermal conductivity of the first portion 112 is greater than that of the second portion 114. For example, the first portion 112 and second portion 114 may be formed from the same material; however, the differing thicknesses T of the portions may provide the first portion 112 and second portion 114 with differing thermal conductivities. Due to the first portion 112 having a greater thermal conductivity than that of the second portion 114, the rate at which heat 108(1) is transferred from the user 102 to the energy storage device 104, through the first portion 112, may exceed the rate at which heat 108(2) is transferred from the energy storage device 104 to the ambient environment 110, through the second portion 114. The temperature of the computing device 300 may thereby increase while the computing device 300 is associated with the user 102.

Figure 4:
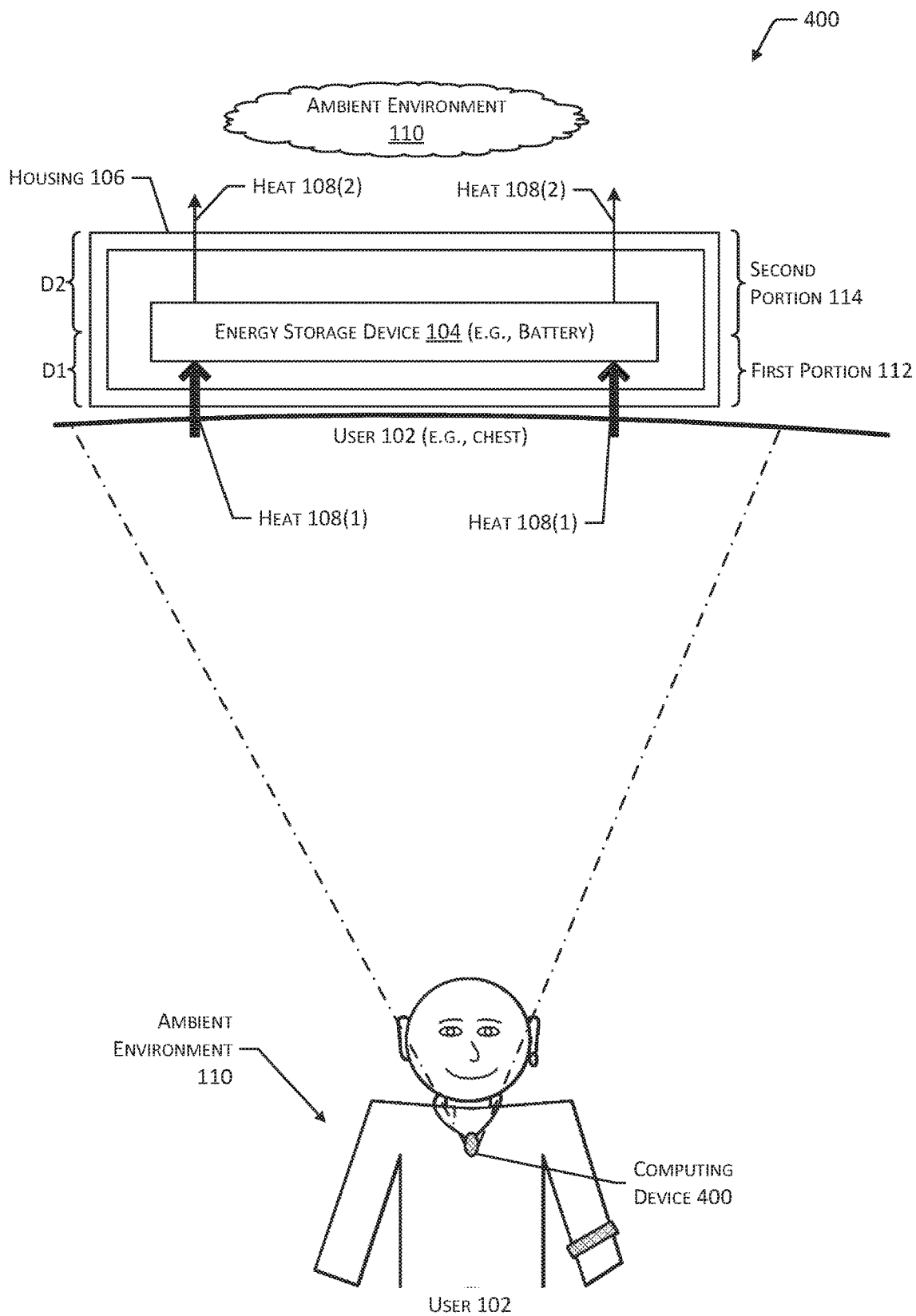
FIG. 4 depicts a computing device within the scope of the present disclosure, illustrating use of the position of an energy storage device within the housing to control the transfer of heat to and from the energy storage device.

FIG. 4 depicts an implementation of a computing device 400 in which the position of the energy storage device 104 within the housing 106 may affect the rate at which heat 108 is transferred toward and away from the energy storage device 104. The computing device 400 is depicted as a wearable computing device 400 having the form factor of a necklace. The depicted computing device 400 includes an energy storage device 104 positioned within the interior of a housing 106. The housing 106 may also enclose other components (not shown) of the computing device 400, air space, connectors between components, and so forth. As such, the energy storage device 104 may be positioned closer to a first side of the housing 106 and more remote from a second side of the housing 106. In some implementations, a wearable computing device 400 may be configured to be worn in multiple orientations. For example, a wearable computing device 400 having the form factor of a necklace or pendant may be rotated, such that either a first portion 112 of the housing 106 or a second portion 114 opposite the first portion 112 may selectively contact a user 102. In other implementations, the position of the energy storage device 104 may be generally symmetrical within the housing 106, such that inadvertent movement or rotation of the computing device 400 does not significantly affect the thermal conductivity of one or more portions of the housing 106.

FIG. 4 depicts the energy storage device 104 positioned a first distance D1 from an interior side of the housing 106 and a second distance D2 from an exterior side of the housing 106, the second distance D2 being greater than the first distance D1. A first portion 112 of the housing 106 may be defined by the portion of the housing 106 between the energy storage device 104 and the user 102 or another adjacent object associated with the computing device 400 during use. A second portion 114 of the housing 106 may be defined as the portion of the housing 106 between the energy storage device 104 and the ambient environment 110 external to the computing device 400. Due to the greater distance D2 between the energy storage device 104 and the ambient environment 110 when compared to the distance D1 between the energy storage device 104 and the user 102, the effective thermal conductivity of the first portion 112 of the housing 106 may be greater than that of the second portion 114. In some implementations, the presence or absence of other components or materials within the interior of the housing 106 may affect the thermal conductivity of the first portion 112 or the second portion 114. In other implementations, the presence or absence of other components or materials external to the housing 106 may affect the effective thermal conductivity of the first portion 112 or the second portion 114. For example, if the wearable computing device 400 is worn beneath a user's coat, sweater, or another insulating garment, the user's garment may function to insulate the second portion 114. Due to the first portion 112 having a greater thermal conductivity than that of the second portion 114, the rate at which heat 108(1) is transferred from the user 102 to the energy storage device 104, through the first portion 112, may exceed the rate at which heat 108(2) is transferred from the energy storage device 104 to the ambient environment 110, through the second portion 114. The temperature of the computing device 400 may thereby increase while the computing device 400 contacts or is proximate to the user 102.

In some implementations, the ambient environment 110 may function as a source of heat 108 that may increase the temperature of an energy storage device 104. For example, if the temperature of the ambient environment 110 exceeds the body temperature of the user 102, the ambient environment 110 may function as a heat source while the user 102 functions as a heat sink.

Figure 5A:
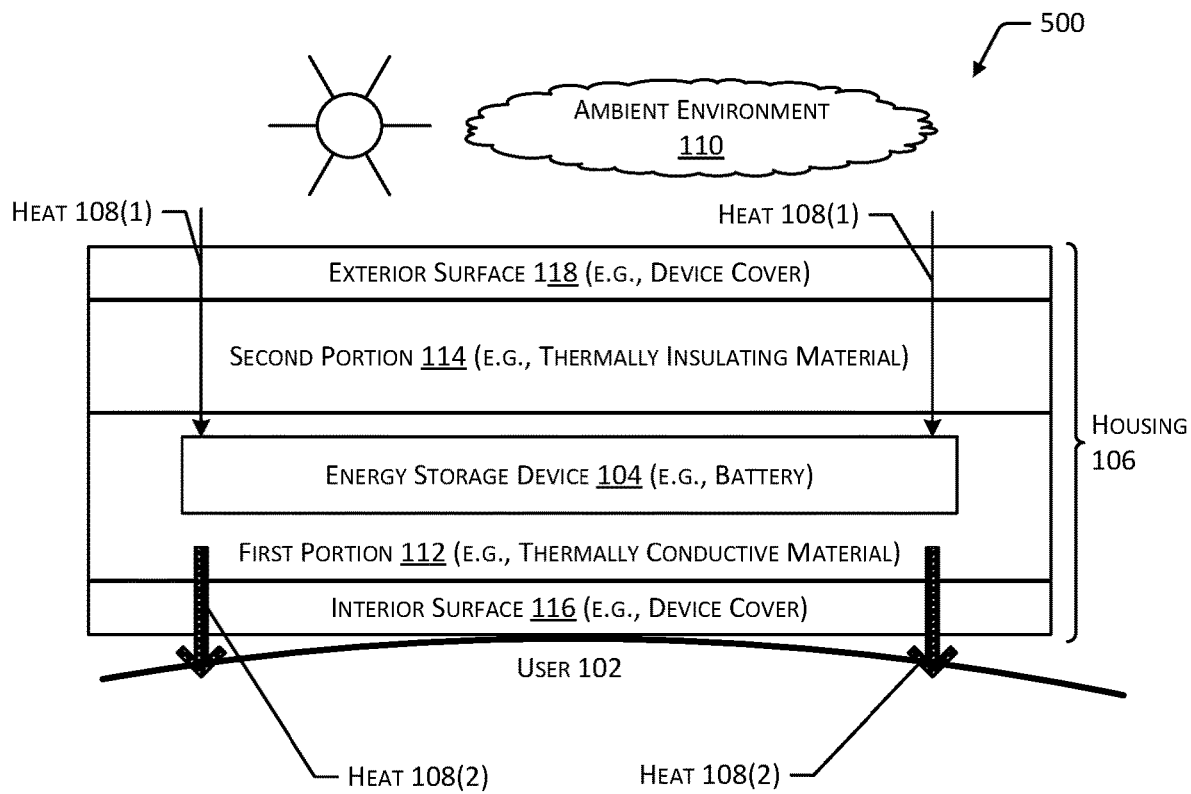
FIG. 5A illustrates an example computing device in which an energy storage device is heated due to heat from an ambient environment and cooled due to transfer of heat to an adjacent user.
Figure 5B:
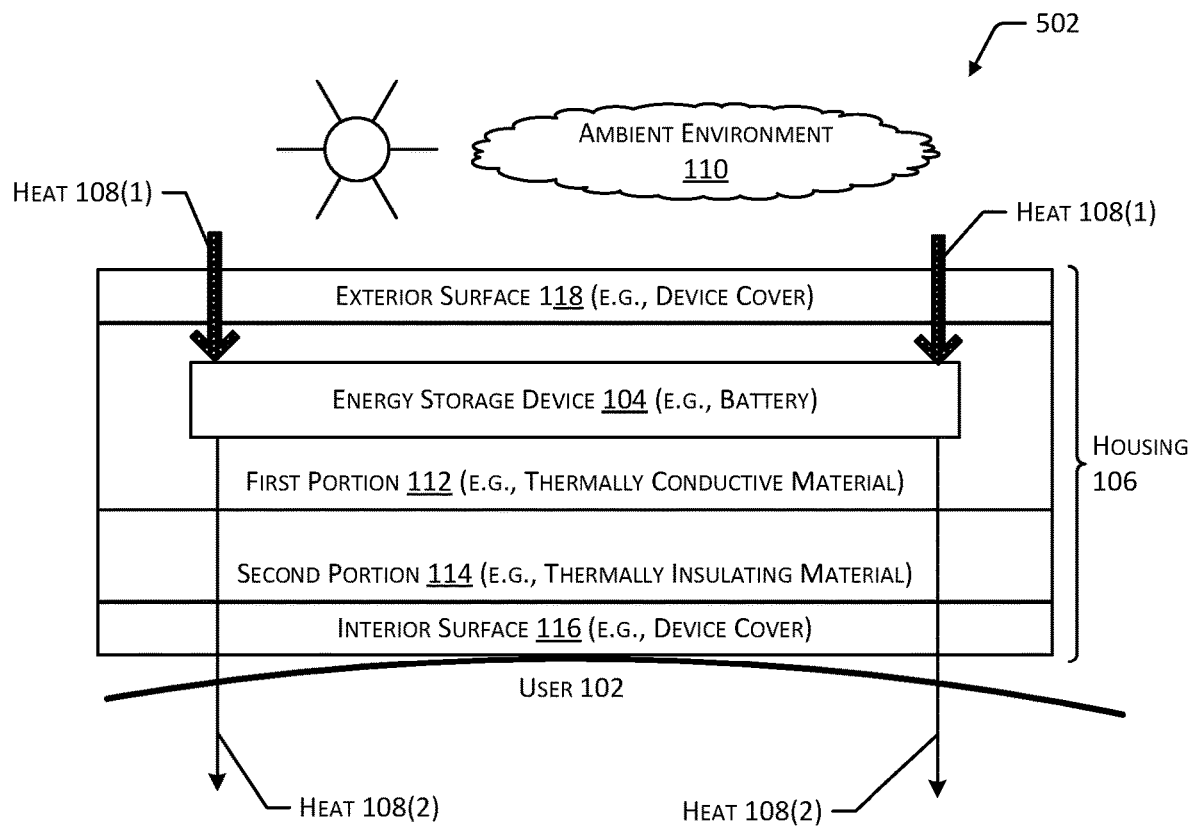
FIG. 5B illustrates an example computing device in which an energy storage device is heated due to heat from an ambient environment and cooled due to transfer of heat to an adjacent user.

FIG. 5 depicts a first example computing device 500 configured to transmit excess or undesired heat 108 to the body of the user 102, effectively using the user's body as a heat sink. The first computing device 500 includes an energy storage device 104 within a housing 106. The housing 106 includes a first portion 112, formed from a thermally conductive material, positioned between the energy storage device 104 and the user 102. The housing 106 also includes a second portion 114, having a thermal conductivity less than that of the first portion 112, positioned between the energy storage device 104 and the ambient environment 110. In some cases, the ambient environment 110 may have a temperature greater than that of the user 102. For example, if a user 102 wears a wearable computing device in a desert, the site of a welding operation, or similar locations, the temperature of the ambient environment 110 may exceed the user's body temperature. Depending on the nature of the energy storage device 104, the energy storage device 104 may provide power to the computing device 500 with greater efficiency at a temperature less than that of the ambient environment 110.

As such, the transfer of heat 108(1) from the ambient environment toward the energy storage device 104 may be at least partially inhibited by the thermally insulating nature of the second portion 114 of the housing 106. Additionally, heat 108(2) from the energy storage device 104 may be transmitted at a greater rate, through the thermally conductive first portion 112, to the user 102 or other adjacent object. Use of the user 102 or another object as a heat sink may slow or prevent an increase in the temperature of the energy storage device 104 due to the heat 108(1) from the ambient environment 110. In some implementations, the thermally conductive first portion 112 may extend in a lateral direction relative to the energy storage device 104, to enable transfer of heat 108(2) to other portions of the computing device 500, other portions of the user's body, or other objects.

FIG. 5 also depicts a second example computing device 502 in which heat 108 from the ambient environment 110 may be used to increase the temperature of an energy storage device 104 while loss of heat 108 to the user's body or another adjacent object is prevented. For example, the optimal operating temperature of the battery within a wearable device may be greater than the temperature of the user's body. If the temperature of the ambient environment 110 exceeds that of the user's body, heat 108 from the ambient environment 110 may be used to increase the temperature of the battery. The depicted computing device 502 includes an energy storage device 104 within a housing 106. A first portion 112 of the housing 106 encompasses the energy storage device 104 and is positioned between the energy storage device 104 and the user 102, while a second portion 114 of the housing 106 is positioned between the energy storage device 104 and the ambient environment 110 external to the computing device 502. The first portion 112 may be more thermally conductive than the second portion 114. For example, the first portion 112 may be formed from a thermally conductive material while the second portion 114 is formed from a thermally insulating material. In other implementations, the thickness of the first portion 112 and the second portion 114 or the placement of the energy storage device 104 within the housing 106 may affect the thermal conductivity of the first portion 112 and second portion 114. In still other implementations, one or more of the interior surface 116 or the exterior surface 118 may be configured to facilitate the absorption or reflection of heat 108. For example, the exterior surface 118 may be colored black or another dark color to facilitate absorption of heat 108 to be conducted by the thermally conductive first portion 112.

Heat 108(1) from the ambient environment 110 may be conducted toward the energy storage device 104, facilitated by the conductive nature of the first portion 112 of the housing 106. The transfer of heat 108(2) from the energy storage device 104 toward the user 102 or other adjacent object may be at least partly reduced due to the insulating nature of the second portion 114. The conduction of ambient heat 108(1) in combination with the reduction of heat 108(2) lost to the user's body may result in an increase in the temperature of the energy storage device 104.

Figure 6:
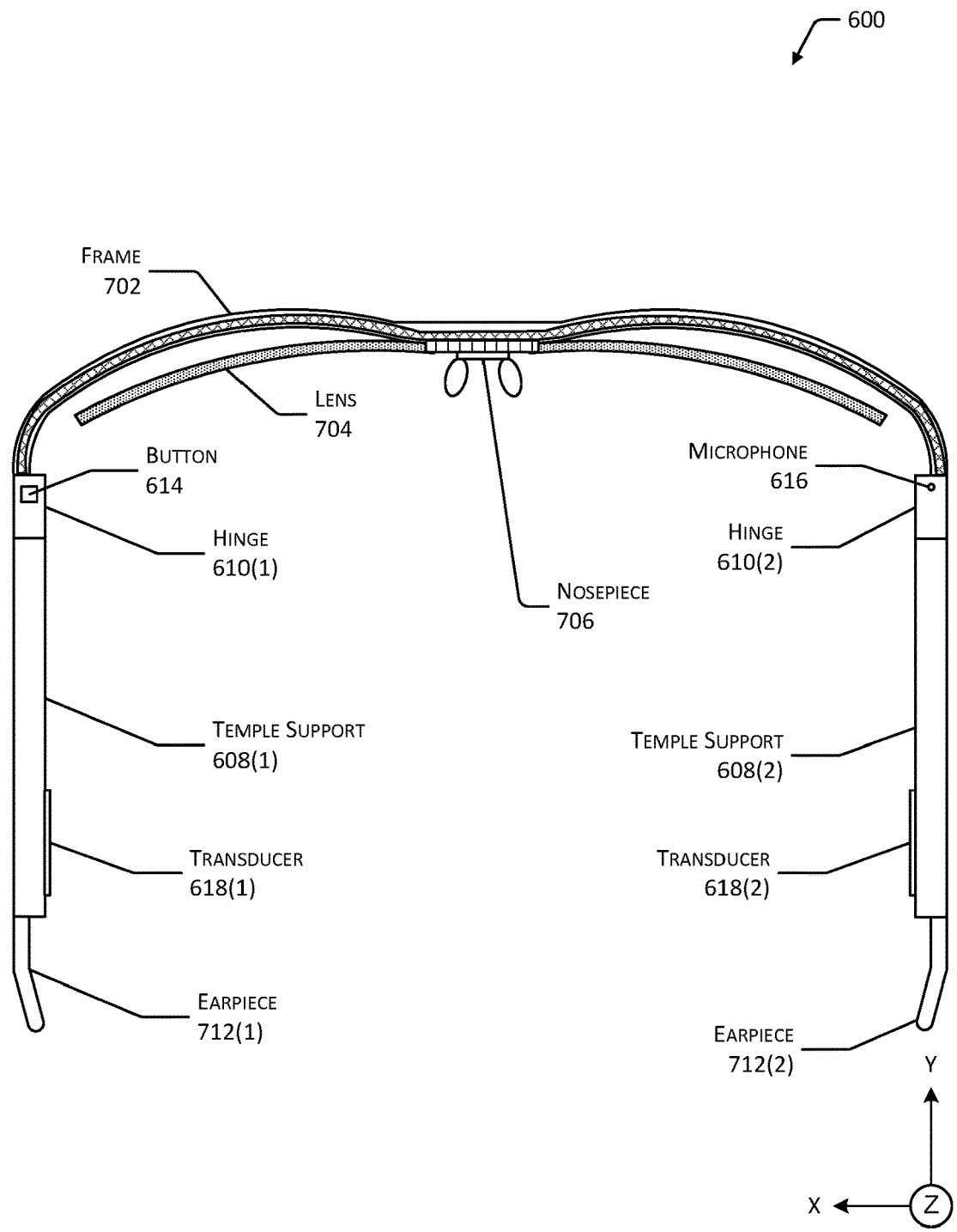
FIG. 6 depicts a wearable computing device within the scope of the present disclosure.

FIG. 6 depicts a bottom view of an example wearable computing device 600 within the scope of the present disclosure. While the depicted wearable computing device 600 is shown as a head-mounted device having the form factor of eyeglasses, other implementations may include devices worn on other parts of the body, devices that contact or are positioned proximate to a user's body during use, such as tablet computers or e-book readers that contact a user's hands for prolonged periods of time, or devices that contact or are positioned proximate to other objects that may function as sources of heat or heat sinks during use. The wearable computing device 600 may include a frame 602 that supports one or more lenses 604. A nosepiece 606 may be positioned proximate to the center of the frame 602. A first temple support 608(1) may be movably secured to a first side the frame 602 using a first hinge 610(1), while a second temple support 608(2) may be movably secured to an opposing side of the frame 602 using a second hinge 610(2). The end of the first temple support 608(1) opposite the frame 602 may include a first earpiece 612(1), and the end of the second temple support 608(2) opposite the frame 602 may include a second earpiece 612(2). The wearable computing device 600 may include various input and output devices. For example, FIG. 6 depicts a button 614 positioned on the first hinge 610(1) for receiving tactile input from a user 102 and a microphone 616 positioned on the second hinge 610(2) for receiving audio input from the user 102. FIG. 6 also depicts a first transducer 618(1) positioned on the first temple support 608(1) and a second transducer 618(2) positioned on the second temple support 608(2) for providing audio output to the user 102. Additionally, one or more of the frame 602 or the lenses 604 may include display components configured to provide visual output to the user 102. The wearable computing device 600 may also include one or more processors, data storage media, communication devices for interacting with one or more networks, and other computing components (not shown). Additionally, the wearable computing device 600 may include an energy storage device 104, such as a small-capacity battery, positioned within a portion of the frame 602, nosepiece 606, temple supports 608, hinges 610, or earpieces 612.

When the wearable computing device 600 is worn by a user 102, the nosepiece 606, first earpiece 612(1), and second earpiece 612(2) may contact the user's body. The frame 602, lenses 604, temple supports 608, hinges 610, and other components may be positioned proximate to the user's body, but may not necessarily contact the user's body. In some implementations, the housing 106 of the wearable computing device 600 (e.g., the frame 602, nosepiece 606, temple supports 608, hinges 610, and ear pieces 612) may be configured to conduct heat 108 toward or away from an energy storage device 104 based on the portions of the housing 106 that contact a user's body. For example, one or more of the nosepiece 606 or earpieces 612 may include a thermally conductive material, while other portions of the wearable computing device 600 include thermally insulating materials. In some implementations, portions of the wearable computing device 600 that do not contact the user's body may be configured to receive radiated heat 204. For example, a typical user's temples may radiate heat to a greater extent than the user's brow. Continuing the example, one or both temple supports 608 may include thermally conductive materials to receive radiated heat 204 from the user's temples, while the frame 602 and lenses 604 do not include such materials.

Figure 7:
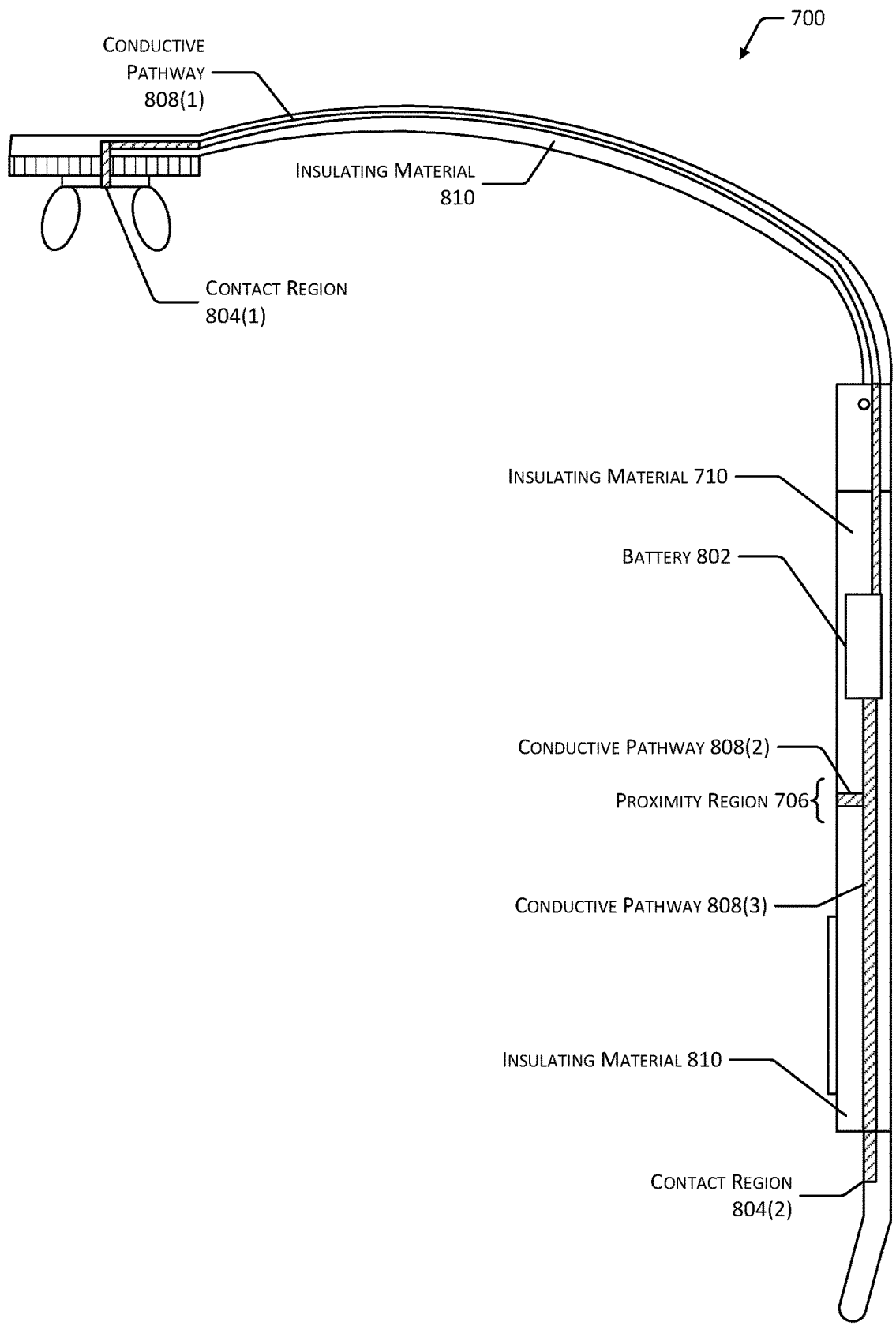
FIG. 7 depicts a partial diagrammatic view of the wearable computing device of FIG. 6, illustrating pathways for conducting heat to or from a battery.

FIG. 7 depicts a diagrammatic view 700 of a portion of the wearable computing device 600 shown in FIG. 6, illustrating placement of a battery 702 in the second temple support 608(2). As described with regard to FIG. 6, during use, a user's body may contact the nosepiece 606 and earpieces 612 of the computing device 600 when worn. As such, the nosepiece 606 defines a first contact region 704(1) where the user's body may touch the exterior of the device housing 106, while the second earpiece 612(2) defines a second contact region 704(2). Because a user's temple may also radiate heat 108 when positioned proximate to the housing 106, a location along the second temple support 608(2) may include a proximity region 706 that may be positioned proximate to a user's temple when the computing device 600 is worn.

The contact regions 704 and proximity region 706 may be configured to receive heat 108 from the body of a user 102 wearing the computing device 600 and transmit the heat 108 toward the battery 702. Specifically, a first conductive pathway 708(1) may extend between the first contact region 704(1), through the nosepiece 606, frame 602, second hinge 610(2), and second temple support 608(2) toward the battery 702. A second conductive pathway 708(2) extends from the proximity region 706 through the second temple support 608(2) toward the battery 702. A third conductive pathway 708(3) extends from the second contact region 704(2) through the second earpiece 612(2) and second temple support 608(2) toward the battery 702. In some implementations, a single conductive pathway 708 may be used to conduct heat 108 from multiple contact regions 704 or proximity regions 706. For example, the depicted conductive pathway 708(2) extending between the proximity region 706 and the battery 702 coincides with the conductive pathway 708(3) extending between the second contact region 704(2) and the battery 702.

The conductive pathways 708 may be formed from one or more thermally conductive materials, such as carbon-based materials, metals, and so forth. In some implementations, one or more of the conductive pathways may include an anisotropic material to facilitate unidirectional transfer of heat 108 toward or away from the battery 702. For example, for conductive pathways 708 having a significant length (e.g., 30 millimeters (mm) or greater), use of anisotropic materials may reduce transmission of heat 108 from the conductive pathways 708 into other regions of the computing device 600.

Each of the conductive pathways 708 may be at least partially enclosed by insulating material 710 within the housing 106. The insulating material 710 may include any materials that are less thermally conductive than that of the conductive pathways 708 and in some implementations, may include a thermally insulating material, such as PET or another plastic. The use of conductive pathways 708 at least partially enclosed by insulating material 710 may facilitate transfer of heat 108 between portions of the user's body that are associated with contact regions 704 or proximity regions 706, and the energy storage device 104, while minimizing the amount of heat 108 that is transferred away from the conductive pathways 708.

While FIG. 7 depicts two contact regions 704 and one proximity region 706 that correspond to portions of the computing device 600 that may contact or be positioned proximate to a user 102, in other implementations, additional contact regions 704 or proximity regions 706 may exist and other portions of the computing device 600 may receive heat 108 from the user's body. For example, the first earpiece 612(1) may also define a contact region 704, and an additional conductive pathway 708 may extend between the first earpiece 612(1) and the battery 702.

Figure 8A:
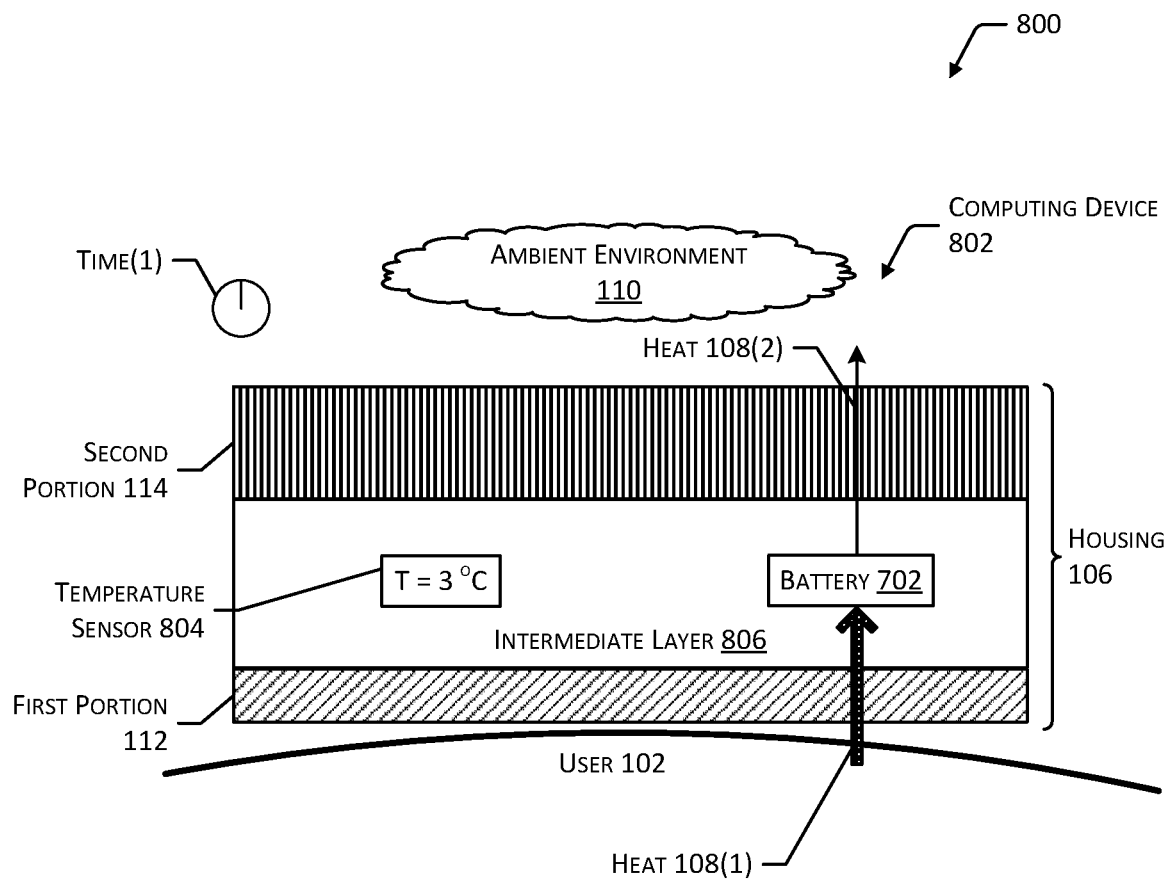
FIG. 8A illustrates an example computing device having portions that change in thermal conductivity based on temperature.
Figure 8B:
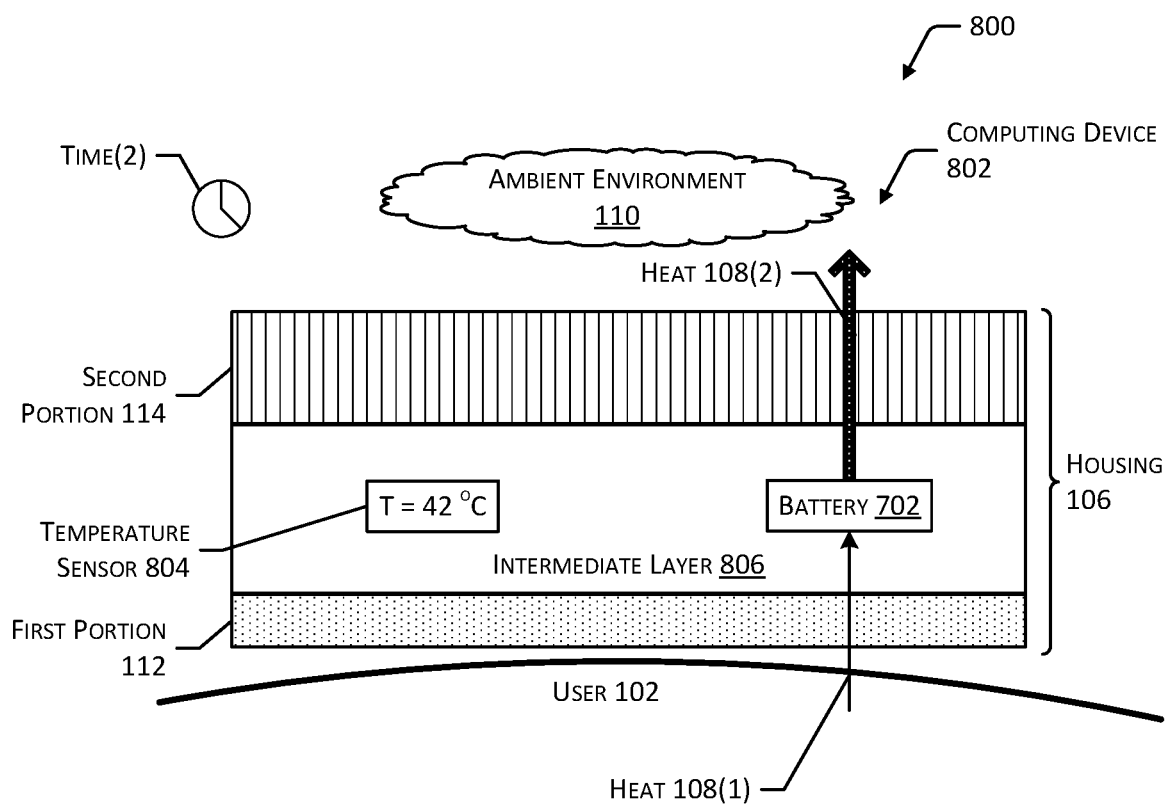
FIG. 8B illustrates an example computing device having portions that change in thermal conductivity based on temperature.

FIGS. 8A and 8B depict block diagrams 800 illustrating a computing device 802 at a first time Time(1) and a second time Time(2). The depicted computing device 802 includes a temperature sensor 804, and the thermal conductivity of one or more portions of the housing 106 may be configured to change based on the temperature of the battery 702 or another component of the computing device 802. The computing device 802 is shown including a battery 702 within a housing 106. The housing 106 includes a first portion 112 formed from a thermally conductive material. The first portion 112 may define the interior surface 116 of the computing device 802 and may be configured to contact or be positioned proximate to a user 102 or another object during use. A second portion 114 of the housing 106 may be formed from a thermally insulating material and may define the exterior surface 118 of the housing 106 that is exposed to the ambient environment 110 during use. The housing 106 may also include an intermediate layer 806 of material that at least partially encloses the battery 702. The intermediate layer 806 may be configured to retain heat 108 and distribute the heat 108 to multiple surfaces of the battery 702. In some implementations, the intermediate layer 806 may have a thermal conductivity less than that of the first portion 112, but greater than that of the second portion 114.

The thermal conductivity of one or more of the first portion 112 or the second portion 114 may be configured to change based on the temperature of one or more portions of the computing device 802. For example, one or more of the first portion 112 or the second portion 114 may include mechanical tubes or other mechanical features that vary the porosity of the portion, a material that changes in color, reflectivity, density, or electrical resistance based on temperature, and so forth. In some implementations, one or more components of the computing device 802 may be configured to cause a change in the thermal conductivity of one or more of the first portion 112 or the second portion 114 based on the temperature determined by the temperature sensor 804.

At a first time Time(1), the temperature of the computing device 802, determined by the temperature sensor 804, may be lower than an optimal temperature for functioning of the battery 702. For example, the temperature sensor 804 may indicate a temperature of 3 degrees C. The computing device 802 is shown receiving heat 108(1) from a user 102 wearing the computing device. The heat 108(1) is conducted, via the first portion 112 of the housing, toward the battery 702. Some heat 108(2) from the battery 702 may also be transmitted, through the second portion 114, to the ambient environment 110. However, the rate at which the heat 108(1) from the user 102 is transmitted to the battery 702 may exceed the rate at which heat 108(2) is transmitted from the battery 702 to the ambient environment 110.

At a second time Time(2), subsequent to the first time Time(1), the temperature of the computing device 802, determined by the temperature sensor 804, may be greater than a threshold temperature. The threshold temperature may be selected to provide for functioning of the computing device 802, safety of the user 102, comfort of the user 102, and so forth. For example, the threshold temperature may be set to a temperature less than 42 degrees C., that has been determined to be a maximum allowable temperature of an object that is to be in contact with the user 102 to avoid discomfort or harm to the user 102. The threshold temperature may be specified by a standards organization, device designer, the user 102, and so forth. For example, the threshold temperature for maximum allowable temperature for a consumer electronic device that is in contact with the user 102 for more than five minutes may be designated by International Standards Organization standards ISO 15536-1:2006, ISO 13732-1:2006, and so forth.

At temperatures at or above the threshold temperature, the thermal conductivity of the first portion 112 may decrease, such that the rate at which heat 108(1) from the user 102 warms the computing device 802 decreases. Additionally or alternatively, the thermal conductivity of the second portion 114 may increase, such that the rate at which heat 108(2) from the battery 702 exits the computing device 802 into the ambient environment 110 increases. In some implementations, the operation of one or more components of the computing device 802 may be modified based on the temperature determined by the temperature sensor 804. For example, the computing device 802 may begin operating in a low power mode to prevent increasing the temperature of the computing device 802 beyond a threshold temperature. As another example, the computing device 802 may shut down or disable one or more functions until the temperature is below a threshold temperature.

Figure 9:
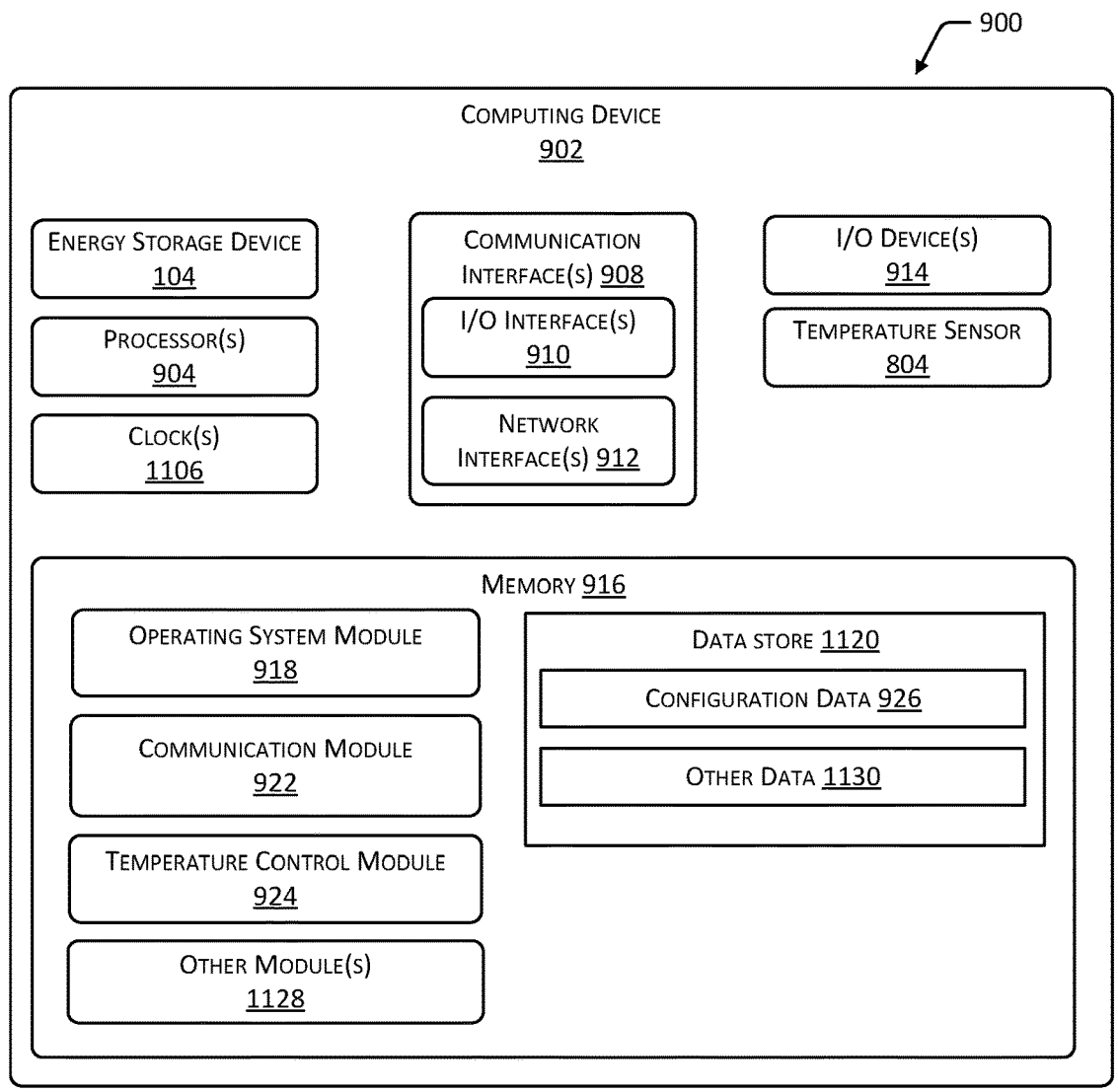
FIG. 9 is a block diagram illustrating components of a computing device within the scope of the present disclosure.

FIG. 9 depicts a block diagram 900 of one or more computing devices 902 within the scope of the present disclosure. The depicted computing device 902 may include any of the computing devices 100, 200, 300, 400, 500, 600, or 802 depicted in FIGS. 1-6 and 8, or any other type of computing device that may contact or be positioned proximate to a user 102 or other object during use.

The computing device 902 may include one or more energy storage devices 104, which may be configured to provide electrical power suitable for operating the components of the computing device 902. In some implementations, the energy storage device 104 may include a rechargeable battery, fuel cell, photovoltaic cell, power conditioning circuitry, and so forth. For example, the energy storage device 104 may include a lithium-ion battery. As another example, the energy storage device 104 may include a glucose and oxygen based fuel cell. As yet another example, the energy storage device 104 may include a pack having one or more cells. For example, the one or more cells may be combined with and controlled by a protection circuit module (PCM) that is configured to control the charging and discharging of the cells.

The computing device 902 may include one or more hardware processor(s) 904 (processors) configured to execute one or more stored instructions. The processor(s) 904 may include one or more cores. One or more clocks 906 may provide information indicative of date, time, ticks, and so forth. For example, the processor(s) 904 may use data from the clock 906 to generate a timestamp, trigger a preprogrammed action, and so forth.

The computing device 902 may include one or more communication interfaces 908, such as input/output (I/O) interfaces 910, network interfaces 912, and so forth. The communication interfaces 908 may enable the computing device 902, or components of the computing device 902, to communicate with servers or other computing devices, or components of other computing devices. The I/O interfaces 910 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 910 may couple to one or more I/O devices 914. The I/O devices 914 may include any manner of input device or output device associated with computing device 902, such as one or more buttons 614, microphones 616, or transducers 618 as shown in FIG. 6. Other example I/O devices 914 may include touch sensors, keyboards, mouse devices, image sensors (e.g., cameras), scanners, displays, speakers, haptic devices, printers, and so forth. In some implementations, the I/O devices 914 may be physically incorporated with the computing device 902 or may be externally placed.

The computing device 902 may also include one or more temperature sensors 804. In some implementations, the temperature sensor 804 may include one or more thermometers. In other implementations, the temperature sensor 804 may include a thermistor configured to change an electrical resistance thereof based on temperature. The temperature sensor(s) 804 may be configured to cause a change in operation of the computing device 902 either actively, such as by communicating a determined temperature to other components of the computing device 902, or passively, such as by changing an electrical characteristic thereof as the temperature of the temperature sensor 804 changes.

The network interfaces 912 may be configured to provide communications between the computing device 902 and other devices, such as the I/O devices 914, routers, access points, and so forth. The network interfaces 912 may include devices configured to couple to one or more networks including LANs, wireless LANs, WANs, wireless WANs, and so forth. For example, the network interfaces 912 may include devices compatible with Ethernet, Wi-Fi, Bluetooth, ZigBee, Z-Wave, 3G, 4G, LTE, and so forth.

The computing device 902 may include one or more busses or other internal communications hardware or software that allows for the transfer of data between the various modules and components of the computing device 902.

As shown in FIG. 9, the computing device 902 may include one or more memories 916. The memory 916 may include one or more computer-readable storage media (CRSM). The CRSM may be any one or more of an electronic storage medium, a magnetic storage medium, an optical storage medium, a quantum storage medium, a mechanical computer storage medium, and so forth. The memory 916 may provide storage of computer-readable instructions, data structures, program modules, and other data for the operation of the computing device 902. A few example modules are shown stored in the memory 916, although the same functionality may alternatively be implemented in hardware, firmware, or as a system on a chip (SoC).

The memory 916 may include one or more operating system (OS) modules 918. The OS module 918 may be configured to manage hardware resource devices such as the I/O interfaces 910, the network interfaces 912, the I/O devices 914, and to provide various services to applications or modules executing on the processors 904. The OS module 918 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 920 and one or more of the following modules may also be stored in the memory 916. The modules may be executed as foreground applications, background tasks, daemons, and so forth. The data store 920 may use a flat file, database, linked list, tree, executable code, script, or other data structure to store information. In some implementations, the data store 920 or a portion of the data store 920 may be distributed across one or more other devices including other computing devices, network attached storage devices, and so forth.

The communication module 922 may be configured to establish communications with servers or other computing devices. The communications may be authenticated, encrypted, and so forth.

The memory 916 may also store a temperature control module 924. The temperature control module 924 may be configured to receive a temperature determined by the temperature sensor 804 and determine whether the received temperature meets or exceeds a threshold value. Configuration data 926 may indicate one or more threshold temperatures and particular actions to be undertaken based on correspondence between the determined temperature and one or more threshold values. For example, if the computing device 902 reaches a first temperature, the thermal conductivity of one or more portions of the housing 106 of the computing device 902 may change in a manner that heats or cools the computing device 902, based on the determined temperature. As another example, if the computing device 902 reaches a second temperature, the computing device 902 may begin to operate in a manner that produces a greater or lesser amount of heat 108, such as by slowing or disabling particular functions. At a third temperature, the computing device 902 may shut down.

Other modules 928 may also be present in the memory 916. For example, data processing and user interface modules may be used to receive user input, manipulate, analyze, and store the received input, and generate and provide output. As another example, the computing device 902 may store one or more applications, such as a browser application.

Other data 930 within the data store 920 may include user input data, such as configurations and settings, user account information, and so forth. Other data 930 may also include security data, such as encryption keys and schema, access credentials, and so forth.

In different implementations, different computing devices 902 may have different capabilities or capacities. For example, servers with which a computing device 902 communicates may have significantly more processor 904 capability and memory 916 capacity compared to the processor 904 capability and memory 916 capacity of wearable computing devices 902.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A wearable device comprising:
a battery configured to provide electrical power to a component of the wearable device; and
a housing including:
an interior portion containing the battery;
a first portion including an exterior surface configured to contact a body of a user, the exterior surface comprising a first material having a first thermal conductivity;
a conductive pathway extending between the exterior surface and the interior portion, wherein a portion of the conductive pathway is partially enclosed by a second material, and wherein the second material has a second thermal conductivity less than the first thermal conductivity; and
a second portion configured to be positioned remote from the body of the user relative to the first portion, the second portion formed from the second material;
wherein the exterior surface of the housing conducts heat away from the body of the user toward the battery, and the second portion prevents transfer of at least a portion of the heat from the battery to an ambient environment proximate to the wearable device.

2. The wearable device of claim 1, further comprising a third material positioned between the battery and one or more of the first portion or the second portion, the third material at least partially surrounding the battery, wherein the third material conducts heat away from the body of the user toward the battery.

3. The wearable device of claim 1, further comprising:
a temperature sensor configured to determine a temperature of a portion of the wearable device proximate to the body of the user;
wherein the component is configured to:
determine that the temperature of the portion of the wearable device exceeds a threshold maximum temperature for the wearable device; and
modify an operation of the wearable device to reduce the temperature of the portion of the wearable device.

4. A wearable device comprising:
an energy storage device that, at a first temperature, provides power to the wearable device at a first efficiency and, at a second temperature, provides power to the wearable device at a second efficiency greater than the first efficiency; and
a housing containing the energy storage device, the housing including:
a first portion having a first thermal conductivity; and
a second portion having a second thermal conductivity less than the first thermal conductivity;
wherein the first portion is configured to be positioned closer to a body of a user than the second portion and transfers heat between the energy storage device and the body of the user.

5. The wearable device of claim 4, wherein the energy storage device includes a battery having a volume of less than or equal to 1.5 cubic centimeters.

6. The wearable device of claim 4, wherein:
the energy storage device includes a fuel cell.

7. The wearable device of claim 4, wherein the first portion of the housing includes a first material positioned between the energy storage device and an exterior of the housing, the first material having the first thermal conductivity; and
the second portion of the housing includes a second material positioned between the energy storage device and an ambient environment proximate to the wearable device, the second material having the second thermal conductivity.

8. The wearable device of claim 4, wherein the energy storage device includes a battery having a first direct current resistance at a temperature of zero degrees Celsius and a second direct current resistance greater than or equal to 2.0 times the first direct current resistance at a temperature of twenty-five degrees Celsius.

9. The wearable device of claim 4, wherein the first portion of the housing includes a first thickness less than a second thickness of the second portion of the housing.

10. The wearable device of claim 4, wherein:
the first portion is positioned on a first side of the energy storage device;
the second portion is positioned on a second side of the energy storage device;
the energy storage device is positioned a first distance from the first portion of the housing and a second distance from the second portion of the housing; and
the first distance is less than the second distance.

11. An apparatus comprising:
an energy storage device; and
a housing containing the energy storage device, the housing including:
a first portion having a first thermal conductivity, wherein the first portion is located between the energy storage device and a first surface; and
a second portion having a second thermal conductivity less than the first thermal conductivity, wherein the second portion is located between the energy storage device and a second surface;
wherein the first portion of the housing transfers heat between the energy storage device and one of an ambient environment or an object external to the apparatus; and
the second portion of the housing prevents transfer of the heat from the ambient environment toward one or more of the energy storage device or the object.

12. The apparatus of claim 11, wherein the energy storage device includes a battery having a first usable energy capacity at a temperature of zero degrees Celsius and a second usable energy capacity greater than or equal to 1.05 times the first usable energy capacity at a temperature of one degree Celsius.

13. The apparatus of claim 11, wherein:
the first portion of the housing transfers heat from the object toward the energy storage device; and the second portion of the housing partially prevents transfer of the heat from the energy storage device toward the ambient environment.

14. The apparatus of claim 11, wherein:
the first portion of the housing transfers heat away from the energy storage device and toward the object; and
the second portion of the housing partially prevents transfer of the heat from the ambient environment to the energy storage device.

15. The apparatus of claim 11, wherein:
the first portion of the housing transfers heat from the ambient environment toward the energy storage device; and the second portion of the housing partially prevents transfer of the heat from the ambient environment to the object.

16. The apparatus of claim 11, wherein:
the first portion includes one or more conductive pathways extending toward the energy storage device; and
the conductive pathways include a thermally conductive material partially enclosed by a thermally insulating material.

17. The apparatus of claim 11, wherein one or more of the first portion or the second portion is configured to modify a thermal conductivity thereof based on a difference between a threshold temperature and a temperature of one or more of the housing or the energy storage device.

18. The apparatus of claim 11, wherein the first portion of the housing includes one or more gaps that directly expose the energy storage device to the one or more of the object or the ambient environment.

19. A wearable device comprising:
an energy storage device; and
a housing containing the energy storage device, the housing including:
 a first portion having a first thermal conductivity, wherein at least a portion of the first portion is located on a first side of the energy storage device; and
 a second portion having a second thermal conductivity less than the first thermal conductivity, wherein at least a portion of the second portion is located on a second side of the energy storage device, the second side being located opposite of the first side;
wherein the energy storage device is positioned a first distance from the first portion of the housing and a second distance from the second portion of the housing, the first distance being less than the second distance.

20. An apparatus comprising:
an energy storage device having a first usable energy capacity at a temperature of zero degrees Celsius and a second usable energy capacity greater than or equal to 1.05 times the first usable energy capacity at a temperature of one degree Celsius; and
a housing containing the energy storage device, the housing including:
 a first portion having a first thermal conductivity; and
 a second portion having a second thermal conductivity less than the first thermal conductivity.

21. An apparatus comprising:
an energy storage device; and
a housing containing the energy storage device, the housing including:
 a first portion having a first thermal conductivity; and
 a second portion having a second thermal conductivity less than the first thermal conductivity; and a third portion at least partially enclosing the energy storage device, wherein the third portion has a third thermal conductivity less than the second thermal conductivity and greater than the first thermal conductivity;
wherein the first portion of the housing transfers heat away from the energy storage device toward an ambient environment external to the housing; and
the second portion of the housing partially prevents transfer of the heat toward the energy storage device.

22. An apparatus comprising:
an energy storage device; and
a housing containing the energy storage device, the housing including:
 a first portion having a first thermal conductivity;
 a conductive pathway extending from an exterior surface of the first portion toward the energy storage device, the conductive pathway including a thermally conductive material partially enclosed by a thermally insulating material; and
 a second portion having a second thermal conductivity less than the first thermal conductivity.

23. An apparatus comprising:
an energy storage device; and
a housing containing the energy storage device, the housing including:
 a first portion having a first thermal conductivity; and
 a second portion having a second thermal conductivity less than the first thermal conductivity;
 wherein one or more of the first portion or the second portion is configured to modify a thermal conductivity thereof based on a difference between a threshold temperature and a temperature of one or more of the housing or the energy storage device.

24. An apparatus comprising:
an energy storage device; and
a housing containing the energy storage device, the housing including:
 a first portion having a first thermal conductivity, wherein the first portion includes one or more gaps that expose the energy storage device to one or more of an object or an environment external to the apparatus; and
 a second portion having a second thermal conductivity less than the first thermal conductivity.

* * * * *